J. LINDER.
VIEW FINDER.
APPLICATION FILED MAY 11, 1914.
1,114,895.
Patented Oct. 27, 1914.
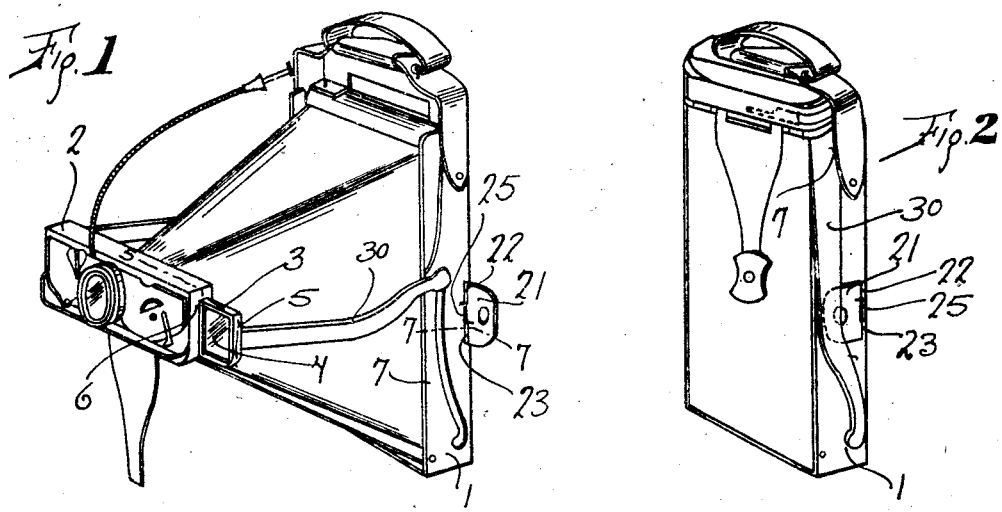
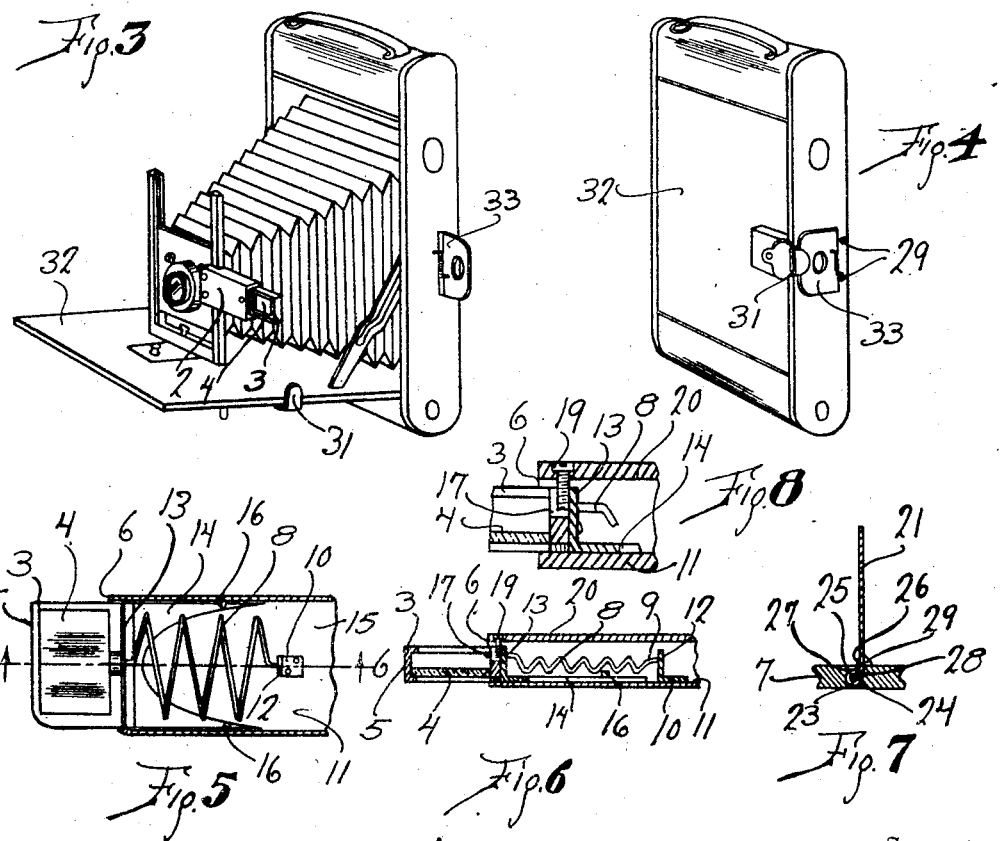
Witnesses
Harold Scantlebury
Ansley Strom
Inventor
John Linder
By Herbert E. Smith
Attorney

UNITED STATES PATENT OFFICE.

JOHN LINDER, OF SPOKANE, WASHINGTON.

VIEW-FINDER.

1,114,895.  Specification of Letters Patent.  Patented Oct. 27, 1914.

Application filed May 11, 1914. Serial No. 837,897.

*To all whom it may concern:*

Be it known that I, JOHN LINDER, a subject of the King of Sweden, residing at Spokane, in the county of Spokane and State of Washington, have invented certain new and useful Improvements in View-Finders, of which the following is a specification.

This invention relates to improvements in view finders which are especially adapted for use in connection with folding cameras.

It is one of the principal objects of this invention to provide a view finder, which is adapted to be held in a retracted position when the camera is closed, and which is so arranged as to be projected into an operative position, automatically, when the camera is unfolded or opened.

It is a further object of the invention to provide an improved view finder which is adapted to be manually retracted from an operative position when the front of the camera is folded into the casing, the view finder being disposed in a manner to coact with the casing so that the latter will function to maintain the view finder in a retracted position until the front of the camera is withdrawn from the casing or back of the camera whereupon the view finder will be released from engagement with the camera casing so as to be spring projected into an operative position.

A further object of my invention is to embody a peep hole, in connection with the lens view finder, the peep hole being formed in a leaf or like element which coacts with portions of the camera in a manner to be automatically released for projection into an operative position with respect to the view finder, when the camera is unfolded or opened.

Further objects of the invention will be more fully described in connection with the accompanying drawing and will be more particularly pointed out in and by the appended claims.

In the drawings:—Figure 1, is a perspective view of one type of folding camera illustrating the application thereto of one form of the device of my invention. Fig. 2, is a perspective view showing the camera closed. Fig. 3, shows the device of my invention applied to an ordinary type of camera with the latter opened. Fig. 4, shows the camera closed. Fig. 5, is a sectional view on line 5—5 of Fig. 1. Fig. 6, is a sectional view on line 6—6 of Fig. 5. Fig. 7, is a sectional view on line 7—7 of Fig. 1. Fig. 8, is an enlarged detail fragmentary sectional view of a portion of the structure shown in Fig. 6.

Like characters of reference designate similar parts throughout the different figures of the drawing.

First, referring to Figs. 1, 2, and 5 to 8, 1 designates the back portion and 2 the front portion of a folding camera, this part of the structure being briefly and generally referred to merely to illustrate the application of the device of my invention thereto. In the lens front or front portion 2, I movably and preferably slidably mount a lens frame 3 in which a concave view lens 4, is disposed. The camera front portion 2 is of hollow construction to permit of retraction of the lens frame 3 thereinto and the parts are so proportioned and arranged that when the lens finder is retracted into the front portion 2, the outermost frame member 5 will lie substantially flush with the edge 6, of the front portion 2, so that when the front portion 2 is folded into the back portion 1, the outer frame member 5 of the finder will engage the inside face of the side 7, of the back portion 1. Means is provided normally acting to project the lens finder into an operative position, preferably automatically, and as shown, said means is in the form of an expansively acting spring 8, one end of which is mounted in a lug 10 secured to the wall 11 of the front portion 2. The lug 10 may be in the form of an angle strip having a bent-up end 12 into which end 9 of the spring 8 may be secured in any desired manner. The remaining end of the spring 8 is connected with an upturned end 13 of a slide 14. The slide 14 is bifurcated, as clearly shown in Fig. 5, and is held against wall 15 for sliding movement thereon or thereagainst by means which may be in the form of lug 16. The view lens frame 3 is attached to the upturned end 13 of the slide 14 and in order to limit projection of the view lens outwardly from the camera front portion 2, I cut away a portion of the frame 3, as indicated at 17, to permit of projection of a stop into the path of the upturned end 13, of the slide 14. As illustrated more particularly in Fig. 8, I dispose a screw 19 in wall 20 of the camera front so that the end of the screw will project into the path of the upturned end 13 which functions as a stop end for the slide 14.

The parts are so proportioned and arranged, as hereinbefore described, that the view finder may be retracted manually into an inoperative position into the camera front portion 2, before the front portion 2 is folded into the back portion 1. When the camera is folded, the view finder will be held in a retracted position by engagement against the inner face of wall 7 of the back portion 1. Immediately upon unfolding or opening movement of the camera, the view finder is released for projection by spring 8 into an operative position. A peep-hole device is provided for use in conjunction with the view finding device and the peep-hole device is also arranged to be automatically projected into operative position when the camera is unfolded.

As shown more particularly in Figs. 1, 2 and 7, a leaf 21 is hinged to the side 7 of the camera back portion 1, as shown at 22, and 23, and a slight cavity is formed, as indicated at 24, so that the hinge will lie inwardly of the surface of 7. A spring 25 is coiled about the pintle of the hinge and one end of the spring bears against the leaf or flap 21, as indicated at 26, while the other end bears against the side 7, in a suitable recess 27. By reason of the fact that the hinge axis is disposed inwardly with respect to the outer face of the side 7, a shoulder 28 is formed which serves to limit projection of the peep-hole leaf 21 into the operative position shown in Fig. 7. However, I may in addition to the shoulder 28, provide lugs 29 as a further stop means to limit outward movement of the peep-hole device. By reason of the fact that the hinge axis of the leaf is below the surface, the leaf 21 may be suitably formed so that it will lie flat against the face of the side 7 when in a folded position.

When the peep-hole device is applied to a camera as shown in Fig. 1, a folding portion such as arm 30 is relied upon to coact with the leaf 21 and hold the latter in a folded position, as shown in Fig. 2, it being understood that when the camera is about to be folded, the operator will manually swing the leaf 21 into the position shown in Fig. 2, from the position shown in Fig. 1, until the arm 30 assumes a closing position, at which point it will overlap the leaf 21 and hold it closed. When the camera is opened or unfolded, the leaf will be released for action by spring 25.

In the form shown in Fig. 3, a lug 31 is secured to a folding portion which may be a platform 32, and is so proportioned that it will overlap leaf 33 and hold it in a folded position as shown in Fig. 4, when the camera is folded or closed. The action and operation of the device of my invention in the form shown in Figs. 1, 2, 3 and 4, are precisely the same, and therefore it is not believed necessary to specifically describe the operation in connection with Figs. 3 and 4.

From the foregoing description it will be appreciated that the device of my invention affords great advantages in permitting the operator to quickly open the camera and take a snap shot of a moving object, it being merely necessary to open the camera, whereupon the view finding device will automatically spring into an operative position so as to be ready when the camera is open. Heretofore, it has been necessary to first open the folding camera and then adjust the view finder and this operation requires so much time that snap shotting a moving object is frequently rendered impossible.

It is believed that the novelty and utility of the device of my invention will be fully understood from the foregoing description and while I have herein shown and described one specific form of my invention, I do not wish to be limited thereto except for such limitations as the claims may import.

I claim:—

1. In a folding camera, folding camera portions, one foldable within the other, and one of said portions including a view finding device movably mounted thereon, and means normally acting to project said device into an operative position when the parts are in an unfolded position, substantially as described.

2. In a folding camera, folding camera portions, a view finding device movably mounted on one portion for engagement by another folding portion to hold said device in a retracted position when the camera is folded, and means acting automatically to project said device into an operative position when the latter is released by unfolding movement of the camera portion, substantially as described.

3. In a folding camera, a view finding device and a peep hole device, folding camera portions supporting and engaging said devices to hold the latter in retracted position when the camera is folded and release said devices on movement of the said camera portion into an unfolded position, and mechanism for projecting said devices into operative position when the latter are released by said camera portions, substantially as described.

4. In a folding camera, a slidable view finding device and a hinged peep-hole device, folding camera portions supporting and engaging said devices to hold the latter in retracted positions when the camera is folded and release said devices on movement of said camera portions into an unfolded position, and mechanism for projecting said devices into operative position when they are released by said folding portions, substantially as described.

5. In a folding camera, interiorly and exteriorly folding camera portions, a view finding device movably mounted on said interiorly folding portion for interior engagement against said exterior portion to hold said device in a retracted position when the camera is folded, and means for projecting said device into an operative position when the camera is unfolded, substantially as described.

6. In a camera, a camera portion, a view finder slidable into said portion into a retracted position, a slide guided for movement in said portion and connected with said finder, a spring in said portion normally acting to slidably project said finder, and a stop for engagement with said guide to limit projection of said finder under the action of said spring, substantially as described.

7. In a folding camera, an exterior portion for receiving parts to be folded, a peephole device hinged to the exterior of said receiving portion, means actuated by folding movement of the camera to retain said device in a folded position, and a spring for projecting said device into an operative position on unfolding movement of said camera, substantially as described.

8. In a folding camera, an exterior portion for receiving parts to be folded, a peephole device hinged to the exterior of said receiving portion, an arm actuated by a folding movement of the camera for retaining said device in a folded position and serving to release said device when the camera is unfolded, and means for projecting said device into an operative position when the camera is unfolded, substantially as described.

In testimony whereof I affix my signature in presence of two witnesses.

JOHN LINDER.

Witnesses:
HAROLD SCANTLEBURY,
ANSLEY STROM.

Copies of this patent may be obtained for five cents each, by addressing the "Commissioner of Patents, Washington, D. C."